United States Patent [19]

Brulet

[11] 4,150,188

[45] Apr. 17, 1979

[54] FIREPROOF LAMINATIONS FOR ELECTRIC AND ELECTRONIC DEVICES AND METHODS THEREFOR

[75] Inventor: Daniel Brulet, Clamecy, France

[73] Assignee: Rhone-Poulenc Industries, Paris, France

[21] Appl. No.: 814,392

[22] Filed: Jul. 11, 1977

[30] Foreign Application Priority Data

Jul. 12, 1976 [FR] France .................. 76 21252

[51] Int. Cl.$^2$ .................. B32B 5/16; B05B 5/00; B05B 3/02
[52] U.S. Cl. .................. 428/283; 428/290; 428/291; 428/306; 428/332; 428/323; 428/327; 428/530; 428/921; 428/474; 428/483; 427/157; 427/373; 427/391; 427/395; 106/18.14; 252/8.1
[58] Field of Search .............. 428/323, 327, 332, 283, 428/291, 290, 528–530, 921, 306, 307, 373, 391, 395; 427/157; 106/15 FP; 252/8.1

[56] References Cited

U.S. PATENT DOCUMENTS

| | | | |
|---|---|---|---|
| 3,395,105 | 7/1968 | Washburn et al. | 428/306 X |
| 3,422,046 | 1/1969 | Thomas et al. | 428/528 X |
| 3,939,107 | 2/1976 | Brown | 428/528 X |
| 4,035,315 | 7/1977 | Ingram | 428/306 X |

Primary Examiner—P. C. Ives
Attorney, Agent, or Firm—Bacon & Thomas

[57] ABSTRACT

Fireproof laminations for electric or electronic devices are comprised of a cellulosic substrate impregnated with a phenolic resin, further incorporating a fireproofing-effective quantity of encapsulated red phosphorus particulates.

24 Claims, No Drawings

FIREPROOF LAMINATIONS FOR ELECTRIC AND ELECTRONIC DEVICES AND METHODS THEREFOR

BACKGROUND OF THE INVENTION

1. Field of the Invention

The present invention relates, generally, to fireproof or fire retardant laminations for use in electronic or electric devices. The present invention also relates to methods for fabricating such laminations.

2. Description of the Prior Art

Numerous processes are recognized in the art for the manufacture of laminations having a utility in electronic or electric devices. Conventionally, a substrate has typically been impregnated with a formol-phenolic type of thermosetting resins, the impregnation being conducted in one or two depository applications of the resin to a, e.g., cellulosic substrate. When the process is characterized as being conducted in two applications, the first impregnation step typically makes use of a relatively low viscosity conventional phenolic resole. The impregnated substrate is then usually steamed to eliminate solvents, and to yield a specific degree of condensation of the resin. Subsequently, a number of sheets, or lamina, are then placed together and pressed at high temperature to yield the desired lamination.

Laminations of these varieties, based upon phenolic resin impregnated paper, are widely utilized in, for example, electrical home appliances, automobiles, children's toys, and the like. In these applications, fireproofing the devices is usually highly desirable, if not mandatory. Typically, fireproofing is accomplished by incorporating into the laminations phosphate esters of aryl, salts and acid derivatives of phosphorous, chlorinated paraffins, brominated aryl derivatives, antimony trioxide, and the like.

In order to effectively rate the fire retardant or fireproof characteristics of these laminations, the Underwriters' Laboratory has established the classifications V0 or V1 in accordance with "UL Subject 94". These tests require the vertical displacement of a sample of 12.7 mm above a Bunsen burner having a 9.5 mm diameter. The distance between the lower edge of the sample and the burner is set at 9.5 mm, and the blue flame of the burner regulated to a height of 19 mm. The flame is maintained for 10 seconds beneath the lower extremity of the sample, and the duration of flame persistency for the first heating noted; the burner is then returned a second time for 10 seconds and the flame persistency for the second heating being noted again. This is repeated with five samples; the total flame persistency must be less than 50 seconds for the V0 classification, and less then 250 seconds for that of V1.

The need to render the laminations employed in electric or electronic devices flameproof is not the only substantial consideration with regard to the desirable physical and chemical features thereof. In addition, the laminations must also possess numerous other characteristics including a resistance to trichloroethylene and a resistance to the absorption of water, be suitable for punching, and have good translucent properties. In order to imbue the laminae with satisfactory punching characteristics, to facilitate fabrication of various devices therefrom, it has been found indispensable to plasticize the phenolic resins. However, in order to yield an article capable of meeting the V0 and V1 classifications of the Underwriters' Laboratory, the substrate, typically paper or other cellulosic materials, must include considerably large quantities of fireproofing agents and adjuvants. While it is conceivable to balance the two afore-mentioned characteristics, optimization of the amount of plasticizer necessary for cold punching the laminae and the amount of fireproofing agents necessary for a V0 classification materially alter the remaining characteristics in a very depreciating sense. That is, this optimization yields a low resistance to trichloroethylene, a rather pronounced tendency for the absorption of water, and a severe diminishment of insulation resistance. Because of this, it is currently impossible to produce laminations which will meet either the V0 or V1 classification and which also are possessed of other very desirable characteristics.

Accordingly, the need exists to provide laminations for electric or electronic devices, which laminations are fireproof in the sense that they can meet the requirements of either V0 or V1 testing, and which are nonetheless possessed of the remaining desirable features ennumerated above. The need also exists to provide a method to produce such laminations, which method is simple, efficient, and economical, from a commercial point of view.

SUMMARY OF THE INVENTION

In accordance with the deficiencies of the prior art, it is a primary object of the present invention to provide lamination material for electric or electronic devices which meets the requirements of Underwriters' Laboratory's Standard 94 for V0 and V1 classifications and yet which also maximizes the material's resistance to trichloroethylene, minimizes its absorption of water, enhances its suitability for punching, and which exhibits good translucence.

It is also an object of the present invention to provide a lamination material meeting the foregoing requirements, which material is based upon a phenolic resin-impregnated cellulosic substrate incorporating a fireproofing-effective quantity of red phosphorous.

Yet another object of the present invention is to provide a lamination material which exhibits the aforementioned characteristics, wherein a red phosphorous fireproofing agent is encapsulated with a compound which is insoluble in water and in organic solvents and their compounds, the encapsulated red phosphorous being incorporated within the phenolic resin impregnant.

It has been ascertained in accordance with the present invention that a lamination material based upon a phenolic resin-impregnated cellulosic substrate may be manufactured to meet the requirements of UL 94 classifications V0 and V1, while also possessing good mechanical properties and resistance to trichloroethylene and absorption of water, by incorporating a fireproofing-effective quantity of an encapsulated red phosphorous. The encapsulant composition is one which is insoluble in water and alcohol, and mixtures thereof, bisphenol-A-tetra-brominated, and a plasticizer. Preferably, the substrate is paper, and most preferably kraft paper; while the preferred phenolic resin is of the resole variety. The impregnation of the cellulosic substrate may be made in either single of double passes.

Yet further objects and advantages of the present invention will become apparent from examination of the following detailed description of the invention.

DETAILED DESCRIPTION OF THE INVENTION

The present invention is directed toward the optimization of fireproofing characteristics of lamination materials for electric or electronic devices, which materials meet the requirements for V0 and V1 classifications in accordance with Underwriter Laboratory's Standard 94. This optimization of fireproofing characteristics is achieved without sacrifice of other important and desirable mechanical and insulation qualities of the materials, including a good resistance to trichloroethylene, a reduced tendency for absorption of water, and ease of mechanical working such as, for example, by punching, and good translucence.

This optimization of physical and chemical qualities is achieved, broadly, by impregnating a cellulosic or similar substrate with a phenolic resin which further incorporates a fireproofing-effective quantity of encapsulated red phosphorous. The encapsulant material is chosen to be insoluble in water, alcohol, and mixtures thereof, and further includes bisphenol-A-tetrabrominated, and a plasticizer therefor. The preferred cellulosic substrate is paper, and most preferably kraft paper; while the preferred phenolic resin is of the resole type. The impregnation process may be accomplished in one pass with a diluted mixture of methanol-toluene (i.e., one which facilitates deposition of the resinous and particulate components), and applied with a dry extract rate ranging between 40 and 80% of a plasticized resole derivative of phenol. The plasticizing component of the phenolic resin is preferably a phosphoric ester of aryl, the sum of the amounts of the plasticizer and fireproofing agent ranging between about 20 and about 80% of the weight of the dry extract of resin.

Alternately, a two pass impregnation process may be employed. The first pass is made with a one-to-one water-alcohol mixture of a phenolic resole having a viscosity lower than about 500 cp, with a dry extract rate of from about 15 to about 25%. The second pass employs a diluted mixture of methanol-toluene with a dry extract between about 45 and about 65%, of a phenolic derivative resole, the plasticized product being combined with an encapsulated red phosphorous, tetra-bisphenol-A, and a plasticizing phosphoric ester of aryl.

In a highly preferred embodiment, the phenol of the base resole for the second pass is an alkylized phenol, and the resole plasticizing product is selected from the group consisting of the siccative oils, such as china wood oil (tung oil), oitisicca oil, linseed oil, castor oil, tall oil, soybean oil, cottonseed oil, and the like.

The red phosphorous component employed in the phenolic resin impregnant is found to be most effective when it possesses a granularity such that the residue in an 80$\mu$ sieve is less than about 10%, the granularity being measured prior to encapsulation. The amount of red phosphorous employed may vary within the range of from about 50 to about 90% based upon the total weight of the encapsulated particulate; the amount of red phosphorous also preferably ranging from about 1 to about 15% relative to the weight of the phenolic resin. The encapsulant material is selected to be insoluble in water, alcohol, and mixtures thereof, organic solvents, and their compounds, and is selected from the group consisting of waxes, paraffins, chlorinated paraffins, reticulable thermoplastic resins, the thermoresistant resins known in the art, and malemides.

When a two step process for impregnation is employed, the first pass preferably deposits an amount of resin ranging between about 12 and about 24% relative to the weight of the paper to be treated. The second pass then optimally deposits an amount of dry material ranging from about 40 to about 80% of the weight of the paper impregnated on the first pass.

The preferred substrate materials for use in fabricating the laminations of the present invention are the cellulosic materials; preferably cellulosic paper, and most preferably kraft paper. However, woven or non-woven webs having a cellulosic base of cotton, or polyamide, polyester, or other organic polymeric fibers are equally well suited for use in conjunction with the present invention.

The first pass phenolic resin is, generally, an aqueous formo-phenolic resole having a weak viscosity, which is prepared on an azotized base as a catalyst. The second pass resin is, basically, a conventional phenol or a substituted phenol, or alkyls such as creosoles or xylenols, para-tertiary-butylphenol, isopropylphenol, cumylphenol, and the like. The plasticizers for the resoles include the siccative oils, phosphates of aryl, phthalates of alkyl, acetals of polyvinyl alcohol, chlorinated paraffins, and equivalent chemical compounds. Among the various fireproofing agents, in addition to the phosphates of aryl or chlorinated paraffins, there may be employed the various, commercially-available brominated products including brominated phenols, brominated phosphates of alkyl, or brominated oxides of phenyl.

In order to further elucidate upon the various objects and advantages of the present invention, the following examples will be given, the same intended to be illustrative and in no wise limitative.

I. Preparation of Single Pass Phenolic Resin

In a reaction vessel, there is condensed at reflux a mixture of 2260 g of phenol and 2640 g of formol, (30% solution), with 100 g of ammonia (20%), until a 1% concentration of free formol is attained. This is then distilled until a 50% proportion of dry resin is yielded.

II. Preparation of Second Pass Phenolic Resin

To a reaction vessel is added 432 g of xylenol, 7.6 g of ammonia (20%), 162 g of paraformaldehyde, and 22 g of castor oil. This mixture is condensed in a vacuum at 20° C. until the resin becomes turbid, and is then distilled to yield a dry extract of 80%.

Two Pass Impregnation of Kraft Paper

The resin prepared in accordance with (I) is diluted with a water-alcohol mixture at a dry extract of 25%, and is employed to impregnate a kraft paper substrate at 115 g/m$^2$, in a conventional manner, to obtain 20% dry matter and 4% volatile constituent with reference to the paper substrate. For the second pass, the product of (II) is mixed with 92 g of methanol and 92 g of toluene. With the mixture thus obtained, the various formulations set forth in the Table below are obtained by appropriate additions of phosphate of tricresoline, tetra-brominated-bisphenol-A, and red phosphorous, the respective percentages being calculated with reference to the dry weight of the resin. The encapsulant for the red phosphorous is selected from a number of compositions including wax, paraffins (Examples 2 and 6), chlorinated paraffins, novolac resins (Examples 7) as set forth in the present inventor's French Patent Application No.

76.08607 of Mar. 19, 1976, and bis-maleimic resins (Examples 8 and 9) in accordance with the present inventor's French Patent Application No. 75.18039, filed June 10, 1975.

The second pass impregnation step is effected on the pre-impregnated paper resulting from the first pass, in such a manner as to deposit 100 to 110 g of dry resin at 4 to 5% volatile materials, with reference to the weight of the paper impregnated after the first step.

To form the laminations, 8 impregnated sheets are stacked and pressed at 100 kg/cm$^2$ for 25 minutes at 160° C.

The Table sets forth the various compositions of the impregnated paper laminations, and the physical and chemical characteristics resultant therefrom. For conciseness, only the salient compositional differences and results are set forth.

zation of insulation resistance. An examination of the Table indicates, however, that the incorporation of the encapsulated red phosphorous of the present invention permits an attainment of the classification V0, while yet meeting the other desirable characteristics. Compare, for example, Examples 1 and 2.

Without the red phosphorous additions, if the amount of brominated fireproofing agents is increased the V0 classification may be obtained, but the ability of the lamination material to be punched is materially reduced. Note Example 3. Further along these lines, without red phosphorous, if the amount of brominated fireproofing agent and plasticizer are increased, the V0 classification may be obtained and the ability to be punched may be maximized, but at the loss of resistance to trichloroethylene. Note Example 4. The advantage of the encapsulated red phosphorous is equally well evident in the

TABLE

| COMPOSITIONS AND CHARACTERISTICS | STANDARDS | EXAMPLES | | | | | | | | |
|---|---|---|---|---|---|---|---|---|---|---|
| | | 1 | 2 | 3 | 4 | 5 | 6 | 7 | 8 | 9 |
| % diphenyl cresyl phosphate | | 30 | 30 | 30 | 35 | 30 | 30 | 30 | 30 | 30 |
| % tetrabromobisphenol A | | 15 | 15 | 25 | 25 | 0 | 0 | 15 | 15 | 15 |
| % red phosphorous (90%) | | 0 | 3 | 0 | 0 | 0 | 3 | 3 | 3 | 3 |
| Resistance to trichloroethylene | NEMA LI 1-10-12 | 3 | 3 | 3 | 1 | 4 | 3 | 3 | 3 | 3 |
| Absorption of water | NF 26-152 | 0.5 | 0.5 | 0.55 | 0.6 | 0.45 | 0.49 | 0.5 | 0.5 | 0.5 |
| Total insulation resistance, water immersion for 24 hours at 50° C. | C 26-150(R 10$^{10}$) | 4 | 3 | 1.5 | 1.3 | 8 | 4 | 3 | 3 | 3 |
| Suitability for punching | C 26-250 | 3 | 3 | 4 | 3 | 3 | 3 | 3 | 3 | 3 |
| Duration of total combustion | UL 94 | 70 | 30 | 42 | 38 | 300 | 210 | 30 | 32 | 34 |
| Classification UL 94 | | V1 | V0 | V0 | V0 | | V1 | V0 | V0 | V0 |

The data regarding fire resistance of the various laminations is achieved in accordance with Underwriter Laboratory's Standard 94, regarding the classifications V0 and V1. The resistance to trichloroethylene is measured in accordance with Standard NEMA LI 1-10-12, a value greater than 2 representing an acceptable level of resistance. The total insulation resistance is measured in accordance with NF C 26-150 (R 10$^{10}$), a value greater than 1 reflecting suitable insulation resistance. The absorption of water, a value of less than 0,75, is measured in accordance with NF 26-152. Suitability or punching is measured in accordance with NF C 26-250, a value of less than 3 indicating adequate punching characteristics. A last important characteristic is that of good translucence, a subjective appraisal not reflected in the Table. However, the laminations produced in accordance with the present invention may be said to possess at least as good a translucence as those examples which fall beyond the scope of the present invention, and subjectively meet the necessary requirements of the applications for which the present laminations are designed.

It is recognized that it is indispensable to plasticize the phenolic resins incorporated in order to facilitate the punching of the lamination materials for fabrication steps. It is also recognized that the paper substrate must incorporate a considerable quantity of fireproofing agents or adjuvants in order to meet the requirements of the V0 or V1 tests. However, by optimizing only these two qualities through additions of the requisite amounts of plasticizers necessary for cold punching and the quantities of fireproofing agents necessary for meeting the UL 94 classifications, it has heretofore been impossible to also obtain the remaining desirable characteristics including a good resistance to trichloroethylene, a reduced tendency for absorption of water, and a maximization laminations classified as V1. Indeed, the additions of red phosphorous permits the realization of this characteristic without the need to incorporate other fireproofing halogen components. In this regard, note Example 6.

While the invention has now been described with reference to certain preferred embodiments, and exemplified with respect thereto, the skilled artisan will appreciate that various changes, modifications, substitutions, and omissions, may be made without departing from the spirit thereof. Accordingly, it is intended that the scope of the present invention be limited solely by that of the following claims.

What is claimed is:

1. Lamination materials adapted for electric or electronic devices comprising a fibrous substrate impregnated with a phenolic resin having incorporated therein a fireproofing-effective quantity of an encapsulated red phosphorous particulate.

2. The article of claim 1, wherein said substrate is a cellulosic material.

3. The article of claim 2, wherein the impregnant comprises a plasticized phenolic resin, a fireproofing-effective quantity of a red phosphorous particulate encapsulated in a composition which is insoluble in water, alcohol, and mixtures thereof, and in organic solvents and their compounds, bisphenol-A-tetra-brominate, and a plasticizer therefor.

4. The article of claim 3, wherein said red phosphorous particulate has a granularity whereby the residue in an 80$\mu$ sieve is less than about 10%, measured prior to encapsulation.

5. The article of claim 4, wherein said red phosphorous comprises from about 50 to about 90% of the encapsulated particulate.

6. The article of claim 5, wherein the encapsulant is selected from the group consisting of waxes, paraffins, chlorinated paraffins, reticulable thermoplastic resins, thermosetting resins, and malemides.

7. The article of claim 2, wherein the cellulosic material is kraft paper, and wherein the impregnant composition comprises a mixture of plasticized phenolic resin, a fire retardant-effective quantity of a red phosphorous particulate encapsulated in a composition which is insoluble in water and/or alcohol, bisphenol-A-tetrabrominate, and a phosphoric ester plasticizer.

8. A lamination comprising a plurality of fused, impregnated fibrous articles defined by claim 2.

9. A process for producing lamination materials adapted for electric or electronic devices, comprising the step of impregnating a fibrous substrate with a phenolic resin incorporating a fireproofing-effective quantity of an encapsulated red phosphorous particulate.

10. The process of claim 9, wherein said impregnating step comprises:
    (a) impregnating said substrate with a dilute, 1:1 water-alcohol mixture of a phenolic resole having a viscosity less than about 500 cp and a dry extract of from about 15 to about 25%; and,
    (b) treating the impregnated substrate of (a) with a dilute mixture of methanol-toluene and a plasticized resole derived from a phenol,
said mixture further including a fireproofing-effective quantity of an encapsulated red phosphorous particulate, tetra-bisphenol-A-brominate, and a plasticizing phosphoric ester of aryl.

11. The process of claim 10, wherein the phenol of the base resole of said treating step is an alkylized phenol, and the plasticizer for said resole is selected from the group consisting of siccative oils, oiticissa oil, linseed oil, castor oil, tall oil, soybean oil, and cottonseed oil.

12. The process of claim 10, wherein said red phosphorous particulate has a granularity whereby the residue in an 80μ sieve is less than about 10%, measured prior to encapsulation.

13. The process of claim 12, wherein said red phosphorous comprises from about 50 to about 90% of the encapsulated particulates.

14. The process of claim 13, wherein the encapsulant composition is selected from the group consisting of waxes, paraffins, chlorinated paraffins, reticulable thermoplastic resins, thermosetting resins, and malemides.

15. The process of claim 10, wherein said impregnating step deposits an amount of resin of from about 12 to about 24% relative to the weight of said substrate, and said treating step deposits an amount of equivalent dry material of from about 40 to about 80% of the impregnated substrate.

16. The process of claim 13, wherein said red phosphorous is present in an amount of from about 1 to about 15%, by weight, relative to said phenolic resin.

17. The article of claim 5, wherein said red phosphorous is present in an amount of from about 1 to about 15%, by weight, relative to said phenolic resin.

18. The article of claim 1, wherein said substrate is paper.

19. The article of claim 1, wherein said substrate is textile fiber.

20. The article of claim 1, wherein said phenolic resin is a resole.

21. The article of claim 18, wherein said phenolic resin is a resole.

22. The lamination of claim 8, having a level of resistance to trichloroethylene of greater than 2, a total insulation resistance of greater than 1, and water absorption of less than 0.75.

23. The lamination of claim 22, further having suitability of punching of less than 3 and good translucence.

24. Lamination materials adapted for electric or electronic devices consisting essentially of a fibrous substrate impregnated with a phenolic resin having incorporated therein a fireproofing-effective quantity of an encapsulated red phosphorous particulate.

* * * * *